US009032896B2

(12) United States Patent
Xie et al.

(10) Patent No.: US 9,032,896 B2
(45) Date of Patent: May 19, 2015

(54) GROUTING AND WELDING COMBINED CONNECTION JOINT APPLIED TO A DEEPWATER FLOATING TYPE PLATFORM AND AN OFFSHORE INSTALLATION METHOD THEREOF

(71) Applicants: China National Offshore Oil Corporation, Beijing (CN); China National Offshore Oil Corporation Research Institute, Beijing (CN)

(72) Inventors: Bin Xie, Beijing (CN); Zhe Jiang, Beijing (CN); Wenhui Xie, Beijing (CN); Junrong Wang, Beijing (CN)

(73) Assignees: China National Offshore Oil Corporation, Beijing (CN); China National Offshore Oil Corporation Research Institute, Beijing (CN)

( * ) Notice: Subject to any disclaimer, the term of this patent is extended or adjusted under 35 U.S.C. 154(b) by 0 days.

(21) Appl. No.: 14/271,327

(22) Filed: May 6, 2014

(65) Prior Publication Data

US 2014/0241811 A1    Aug. 28, 2014

Related U.S. Application Data

(63) Continuation-in-part of application No. 13/702,302, filed as application No. PCT/CN2010/001948 on Dec. 2, 2010, now Pat. No. 8,733,266.

(30) Foreign Application Priority Data

Jun. 9, 2010    (CN) .......................... 2010 1 0199308

(51) Int. Cl.
*B63B 35/44*    (2006.01)
*F16L 1/26*    (2006.01)

(52) U.S. Cl.
CPC ........................................ *F16L 1/26* (2013.01)

(58) Field of Classification Search
CPC ............................ B63B 35/4413; B63B 9/065
USPC .................................................. 114/264–266
See application file for complete search history.

(56) References Cited

U.S. PATENT DOCUMENTS 4,181,454 A * 1/1980 Knox et al. ................... 405/227
4,864,958 A    9/1989 Belinsky
(Continued)

FOREIGN PATENT DOCUMENTS

CN    2772957 Y    4/2006
CN    2839108 Y    11/2006
(Continued)

OTHER PUBLICATIONS

ISA China, International Search Report of PCT/CN2010/001948, Mar. 17, 2011, WIPO, 6 pages.

*Primary Examiner* — Stephen Avila
(74) *Attorney, Agent, or Firm* — Alleman Hall McCoy Russell & Tuttle LLP

(57) ABSTRACT

The present disclosure relates to a grouting and welding combined connection joint and an offshore installation method thereof, characterized in that: it comprises a set of grouting systems disposed inside of the annular space formed by an inner shell of the central pore canal of a column with large cross section and an outer wall of a column with small cross section, as well as a group of brackets welded on a top deck of a column with small cross section and an inner shell of the central pore canal of the column with large cross section. The grouting and welding combined connection joint provided by the present disclosure has advantages of being able to adapt to the connection of different dimensions of columns, and having simple offshore installation, highly reliable structural safety and low cost.

2 Claims, 4 Drawing Sheets

(56) References Cited

U.S. PATENT DOCUMENTS

| | | | |
|---|---|---|---|
| 4,983,073 A | | 1/1991 | Petty et al. |
| 5,113,631 A | * | 5/1992 | diGirolamo et al. ......... 52/236.8 |
| 6,024,040 A | | 2/2000 | Thomas |
| 6,164,234 A | * | 12/2000 | Manschot et al. ............ 114/265 |
| 6,652,192 B1 | | 11/2003 | Xu et al. |
| 6,718,901 B1 | | 4/2004 | Abbott et al. |
| 6,761,124 B1 | | 7/2004 | Srinivasan |
| 6,899,492 B1 | | 5/2005 | Srinivasan |
| 7,963,241 B2 | | 6/2011 | Srinivasan |
| 8,733,266 B2 | * | 5/2014 | Xie et al. ...................... 114/265 |
| 2003/0206772 A1 | * | 11/2003 | Horne et al. .................. 405/224 |
| 2004/0159276 A1 | * | 8/2004 | Persson ......................... 114/264 |
| 2004/0182299 A1 | * | 9/2004 | Kent et al. ..................... 114/266 |
| 2005/0120935 A1 | | 6/2005 | Wybro et al. |
| 2005/0160958 A1 | | 7/2005 | Kryska et al. |
| 2006/0204340 A1 | | 9/2006 | Leenaars |
| 2008/0264322 A1 | | 10/2008 | Horton et al. |
| 2009/0205554 A1 | | 8/2009 | Srinivasan |
| 2010/0024705 A1 | | 2/2010 | Leverette |

FOREIGN PATENT DOCUMENTS

| | | |
|---|---|---|
| CN | 101475049 A | 7/2009 |
| CN | 201343129 Y | 11/2009 |
| CN | 101857072 A | 10/2010 |
| WO | 9623690 A1 | 8/1996 |
| WO | 9957010 A1 | 4/1999 |

* cited by examiner

GROUTING AND WELDING COMBINED CONNECTION JOINT APPLIED TO A DEEPWATER FLOATING TYPE PLATFORM AND AN OFFSHORE INSTALLATION METHOD THEREOF

CROSS-REFERENCE TO RELATED APPLICATION

The present case is a continuation-in-part of U.S. patent application Ser. No. 13/702,302, filed Dec. 5, 2012 and entitled "Integrative Deep Draft Floating Production Platform with Unconditional Stability and Offshore Installation Method Thereof," now U.S. Pat. No. 8,733,266 issued May 27, 2014, which is a national phase application of PCT/CN2010/001948 filed Dec. 2, 2010, which in turn claims priority to Chinese Patent Application No. 201010199308.5, filed Jun. 9, 2010. The entire contents of each application are hereby incorporated by reference for all purposes.

TECHNICAL FIELD

The present disclosure relates to a grouting and welding combined connection joint applied to a deepwater floating type platform and an offshore installation method thereof, wherein the joint can be used for the connection between steel structures of a deepwater floating type oil production platform, which is applicable to a connection joint type between large-scale steel structures which is performed in the offshore floating state, including an integrally equipped heavy draught floating type oil production platform with unconditional stability, and an offshore installation method thereof.

BACKGROUND

During the offshore installation of the mother case, "An Integrally Equipped Heavy Draught Floating Type Oil Production Platform with Unconditional Stability", a column with small cross section is gradually transferred to a lower level through the central pore canal of a column with large cross section in a controlled state, and then columns with small cross section and large cross section are permanently connected. The adopted connection manner is as follows: using a crane to place a hydraulic forging connection equipment through the central pore canal at the junction of columns with small cross section and large cross section for hydraulic forging, and plastically deforming an outer wall plate at the junction of columns with small cross section and large cross section by a hydraulic pressure, and then squeezing the outer wall plate into a groove of a chopping board connection structure at the junction of a lower portion of the column with large cross section so that structures of the two portions are coupled as a whole by the full strength.

In the mother case, the offshore installation and connection operation is the key operation condition, which mainly has the following technical challenges and risks: (1) during installation, columns with large cross section and small cross sections are in the state of motion, wherein the operating space is small, and in addition to the limitation of environmental conditions, the installation time is restricted; (2) after the platform is in place, the connection joint is one of the areas subjected to the largest external load in the entire platform, which bears the combined effect of a bending moment and a shear force, and also has challenges about how to ensure the strength and fatigue of a joint.

Considering the technical difficulty of the connection joint, although a hydraulic expanding tube provided by the mother case is feasible, there exists the following problems in operation: (1) in the mother case, when a structural plastic deformation is made by a hydraulic pressure, the accuracy control requirement for relative positions of the grooves of columns with large cross section and small cross sections is high, but at this time columns with large cross section and small cross sections are in the state of motion, having a vertical movement, a horizontal movement and a rotation, so there exists great difficulty to ensure the relative positions of the both unchanged; (2) it is difficult for the prior art of the hydraulic expanding tube to adapt to connections of columns with a large diameter, which brings a great limitation to the design of columns of the platform; (3) the original connection solution makes the local structure (e.g., the local area of an inner wall of the column with large cross section and an outer wall of the column with small cross section) of the platform plastically deformed, and columns with large cross section and small cross sections are connected as a whole by plastic deformation, wherein the process is not reversible, and once a problem arises in operation, it will have a great impact on the platform structure, so there exists technical and safety risks in the solution.

SUMMARY

For the above problems, the present disclosure provides a grouting and welding combined connection joint which can adapt to different dimensions of columns, having simple offshore installation, highly reliable structural safety and low costs, and provides an offshore installation method thereof.

To achieve the above object, the present disclosure adopts the following technical solution: A grouting and welding combined connection joint applied to a deepwater floating type platform, characterized in that: it comprises a set of grouting system disposed inside an annular space formed by an inner wall of a central pore canal of a column with large cross section and an outer wall of a column with small cross section, as well as a group of brackets welded on a top deck of the column with small cross section and the inner shell of the central pore canal of the column with large cross section; the grouting system includes a number of shear keys, a diaphragm, upper and lower layer fixing devices, two sets of grouting systems and grouting material; said brackets are arranged uniformly along circumferential direction of the top deck of the column with small cross section, with stiffeners prefabricated on the brackets, wherein the bottom of the brackets are welded with the top deck of the column with small cross section, and connected with a bulkhead of the column with small cross section as a whole; side of the brackets are welded with the inner shell of the central pore canal of the column with large cross section, and connected with a inner bulkhead of the column with large cross section as a whole.

For the above grouting and welding combined connection joint applied to a deepwater floating type platform, the grouting systems include shear keys, a diaphragm, two-layer fixing devices, two sets of grouting systems and grouting material, wherein the grouting area is located in the annular space formed by the inner wall of the column with large cross section and the outer wall of the column with small cross section. The shear keys are staggered circumferentially along the inner wall of the column with large cross section and the outer wall of the column with small cross section; the diaphragm is mounted at the bottom of the annular space to prevent from leakage of slurry; the fixing device includes a two-layer structure, wherein the upper-layer fixing device is located at the top of the column with small cross section, which connects the top of the column with small cross section and the column with large cross section, and the lower-layer fixing device is located above the diaphragm, which connects the bottom of the column with large cross section and the column with small cross section. The fixing device can connect columns with large cross section and small cross sections as a whole through wedges, bolts or latches, and also can adopt a hydraulic pile gripper so that there is no relative movement between columns with large cross section and small cross section; the grouting systems include primary and secondary grouting systems, wherein during normal operation, the grouting is performed inside the annular space through a main grouting valve of the primary grouting system, and then the standard for the ending of grouting is judged by detecting the proportion of reflux slurry at a backflow valve; when a fault of the primary grouting system occurs, the grouting is performed inside the annular space by an auxiliary grouting valve of the secondary grouting system; the grouting material is ordinary cement slurry mixed with an appropriate amount of steel fibers or some synthetic fibers, increasing resistance to fatigue of the cement slurry.

For the above grouting and welding combined connection joint applied to a deepwater floating type platform, the welding structure includes the brackets which connect the top of the column with small cross section and the inner shell of the central pore canal of the column with large cross section, as well as the stiffeners on the brackets; said brackets are arranged uniformly along circumferential direction of the top deck of the column with small cross section, the number of brackets is determined by structural calculating results, and can be sector plates, curved plates, square plates, etc.; a number of stiffeners are prefabricated on the brackets, which have completed prefabrication in the shipyard before offshore installation and welded with the brackets as a whole; while welding, each toggle plate has two welding seams, wherein the bottom of the brackets is welded with the top deck of the column with small cross section, and connected with the bulkhead of the column with small cross section as a whole by using penetration fillet weld; the side of brackets are welded with the inner shell of the central pore canal of the column with large cross section, and connected with the bulkhead of the column with large cross section as a whole by using penetration fillet weld.

A grouting and welding combined connection joint applied to a deepwater floating type platform, and offshore installation steps thereof are as follows: (1) temporary fixing: when the column with small cross section reaches the design position, adopting the upper-and-lower layer fixing devices to fix the column with small cross section, so that there is no relative movement between columns with small cross section and large cross section; (2) discharging ballast: adopting a diaphragm to seal a gap between the column with small cross section and the bottom of the column with large cross section, to discharge sea water inside the central pore canal by pumps; (3) grouting: starting the grouting system to implement grouting operations; (4) preparation before welding: upon the cement slurry being coagulated, after an on-site examination, starting welding operations, and then by an elevating device, transferring personnel and prefabricated brackets to a lower level from the central pore canal onto the platform of the top deck of the column with small cross section; (5) welding operations: welding the bottom of each prefabricated brackets on the top deck of the column with small cross section and the inner shell of the central pore canal of the column with large cross section.

Due to the adoption of the above technical solution, the present disclosure has the following advantages: (1) grouting and welding technologies adopted by the present disclosure both have a higher degree of technological maturity, low cost, few underwater operations and easy operation; (2) the combined connection joint takes grouting as a main load-bearing structure, and welded brackets as an auxiliary load-bearing structure. The grouting connection is adopted to connect columns with large cross section and small cross sections as a whole, which can achieve an effective transfer of load between structures; the axial shear force is mainly born through brackets to reduce an alternating shear force born by cement slurry, increase the fatigue life of cement slurry, and improve reliability and redundancy of the overall system structure; (3) due to the adoption of the two-layer fixing devices, when grouting connection operations are performed under the deepwater environmental condition, the grouting connection joint still can ensure that there is no relative movement between columns with large cross section and small cross sections, the structure is in a steady state, and cement slurry are left undisturbed in the stage of coagulating and hardening, thus ensuring that the strength of the coagulated cement slurry can reach expected design effects.

In summary, the grouting and welding combined connection joint provided by the present disclosure has the advantages of being able to adapt to different dimensions of columns, and having simple offshore installation, highly reliable structural safety and low cost.

DETAILED DESCRIPTION

The present disclosure is described in detail in combination with the drawings below.

Figure 1:
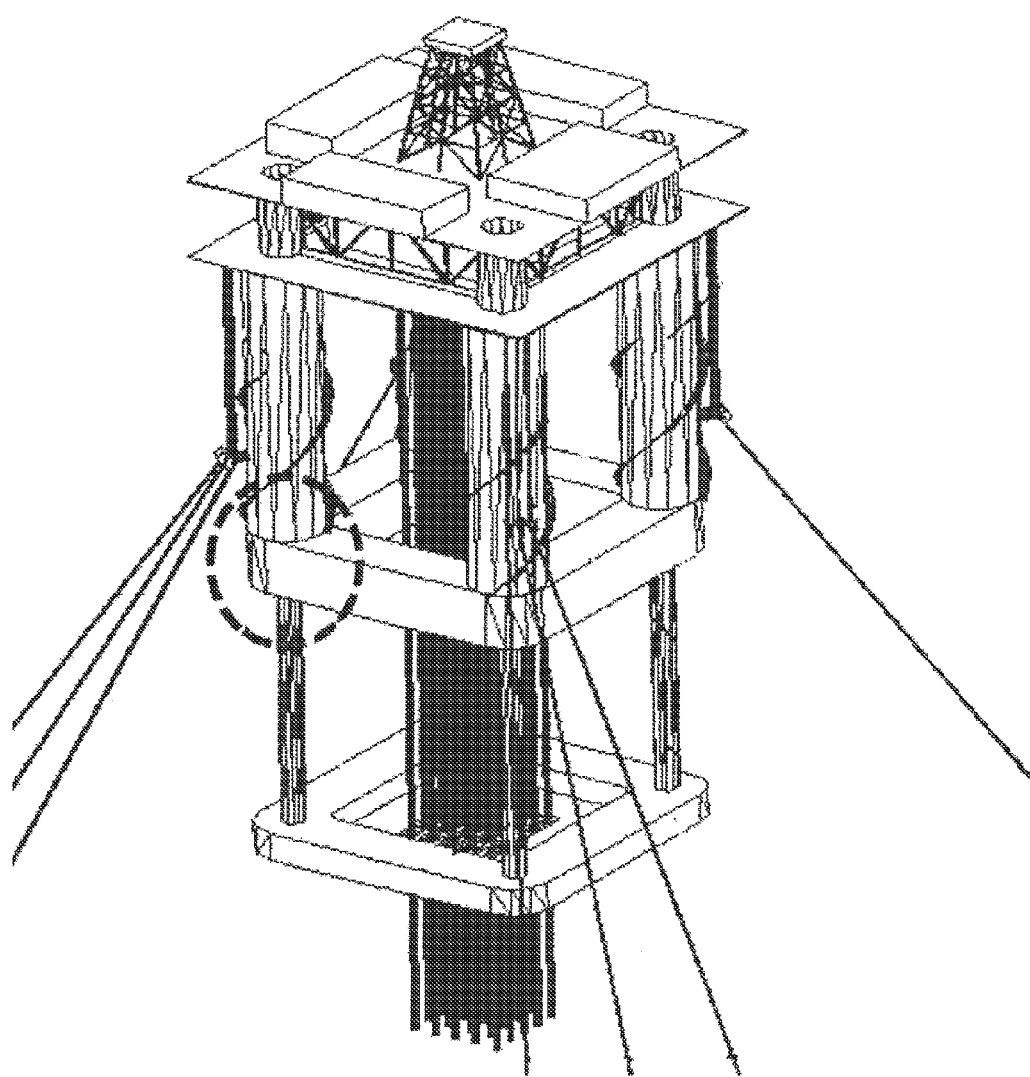
FIG. 1 is an integrally equipped heavy draught floating type oil production platform with unconditional stability, and application location of the present disclosure therein.
Figure 2:
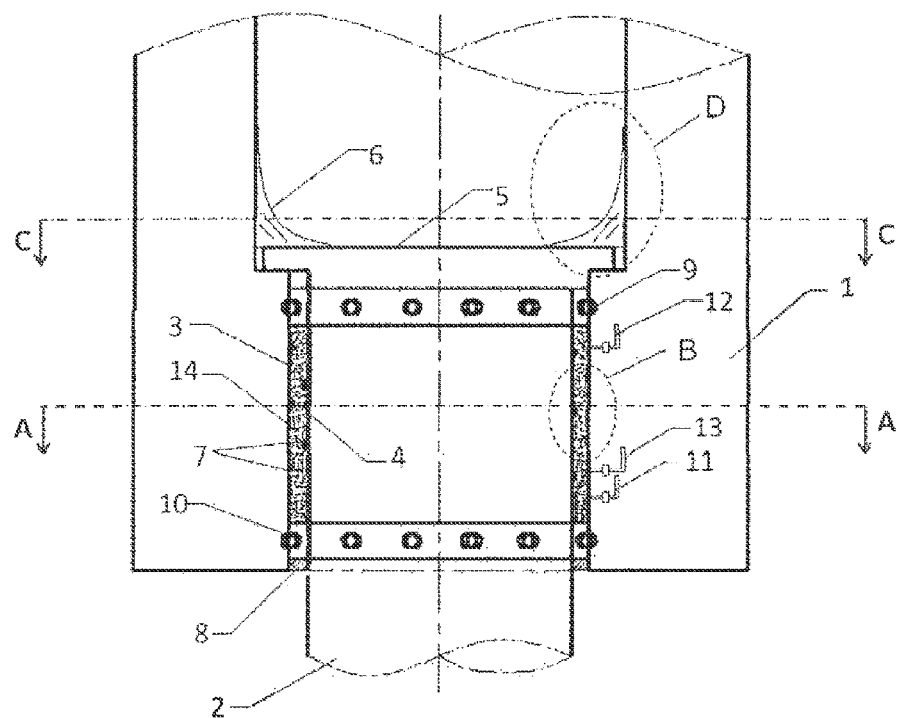
FIG. 2 is a schematic view of a grouting and welding combined connection joint of the present disclosure.

As shown in FIGS. 1 and 2, the shown position of the platform provided in the patent "An Integrally Equipped Heavy Draught Floating Type Oil Production Platform with Unconditional Stability And an Offshore Installation Method Thereof" can adopt the grouting and welding combined connection joint of the present disclosure, which is applied to the connection between a column 1 with large cross section and a column 2 with small cross section.

As shown in FIG. 2, the grouting and welding combined connection joint of the present disclosure comprises a set of grouting systems disposed inside the annular space formed by an inner shell 3 of the central pore canal of the column with large cross section and an outer shell 4 of the column with small cross section, as well as a group of brackets 6 welded on a top deck 5 of the column with small cross section and an inner shell 3 of the central canal of the column with large cross section.

Figure 3:
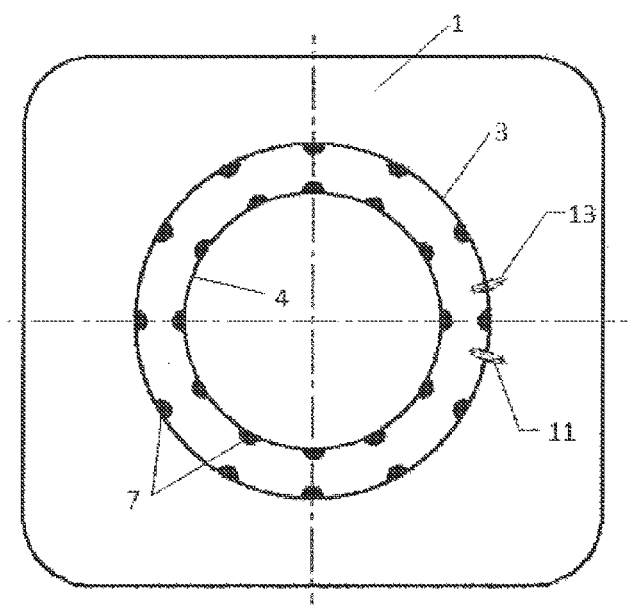
FIG. 3 is a cross-sectional top view of A-A in FIG. 2.
Figure 4:
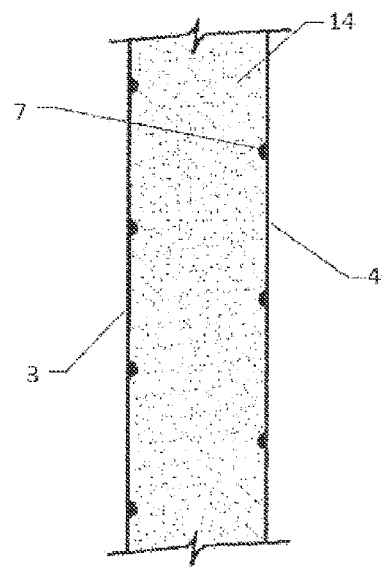
FIG. 4 is an enlarged schematic view of part B in FIG. 2.

As shown in FIGS. 2-4, the grouting joint includes a number of shear keys 7 disposed inside the annular space, a diaphragm 8 and upper and lower layer fixing devices (an upper-layer fixing device 9 and a lower-layer fixing device 10), two sets of grouting systems (a main grouting valve 11, a backflow valve 12 and an auxiliary grouting valve 13) and grouting material 14; at the top of the column 2 with small cross section, the column 1 with large cross section and the column 2 with small cross section are fixed and connected by the upper-layer fixing device 9; at the bottom of the column 1 with large cross section, the bottom of the column 1 with large cross section and the column 2 with small cross section are fixed and connected by the lower-layer fixing device 10, so that it can be effectively ensured that there is no relative movement between the column 1 with large cross section and the column 2 with small cross section, thus ensuring grouting effects. The shear keys 7 are disposed on the inner shell 3 of the central pore canal of the column with large cross section and the outer shell 4 of the column with small cross section; the shear keys 7 are weld beads (which is not limited to this, but also can be fillet weld flat steels or fillet weld round steels), which are disposed circumferentially along the inner shell 3 of the central pore canal of the column with large cross section and the outer shell 4 of column with small cross section, and the shear keys 7 on the inner shell 3 of the central pore canal of the column with large cross section and the outer shell 4 of column with small cross section are staggered.

Figure 5:
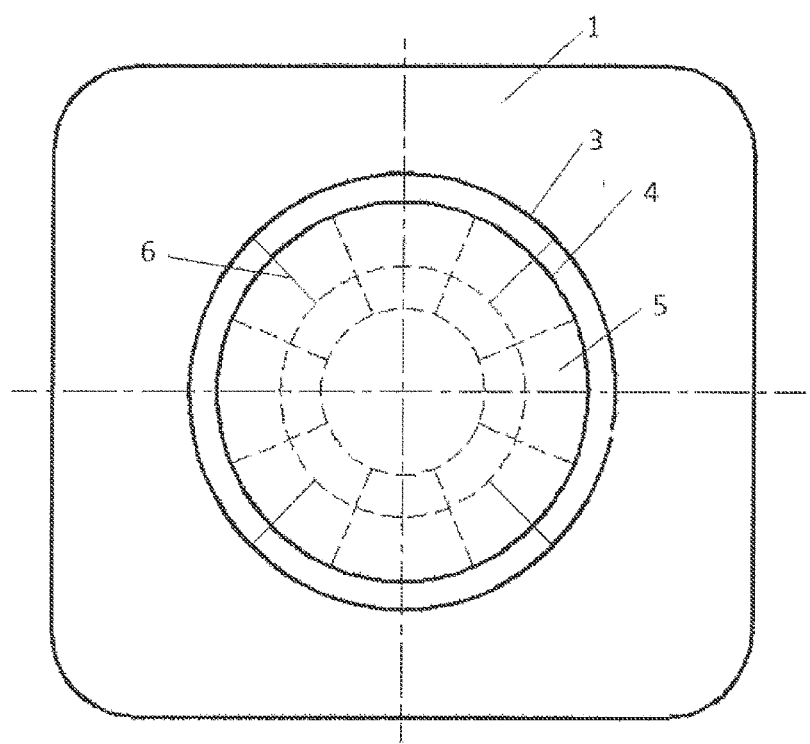
FIG. 5 is a cross-sectional top view of C-C in FIG. 2.
Figure 6:
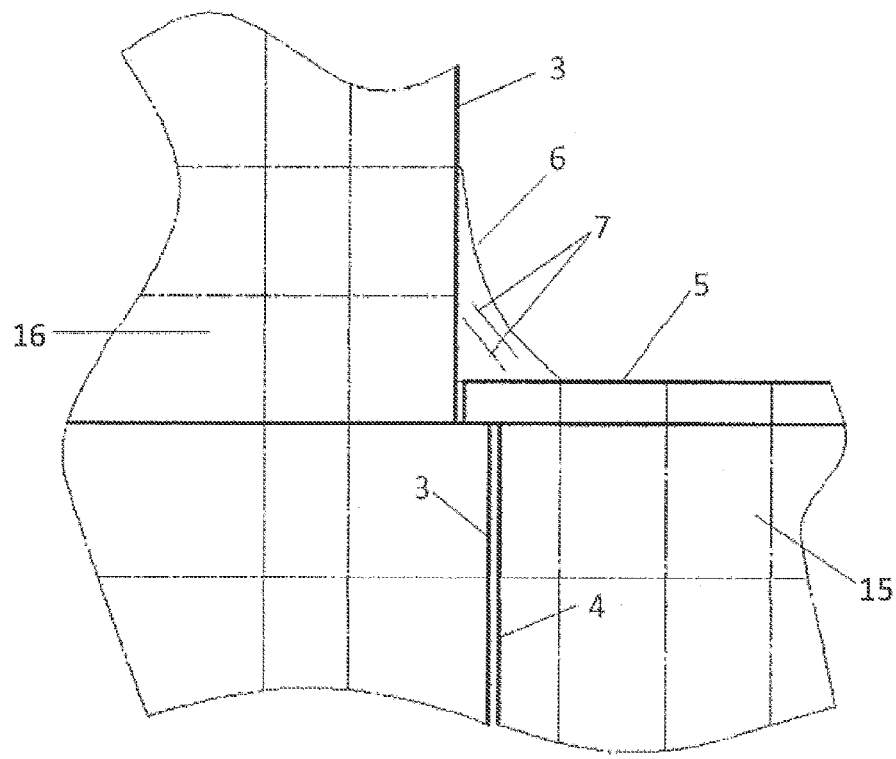
FIG. 6 is an enlarged schematic view of part D in FIG. 2.

As shown in FIGS. 5-6, the welding structure includes brackets 6 which connect the top deck 5 of the column with small cross section and the inner shell 3 of the central pore canal of the column with large cross section, as well as stiffeners 7 thereon. The brackets are arranged uniformly along the circumferential direction of the top deck 5 of the column with small cross section, which can be curved plates (which is not limited to this, but also can be sector plates or square plates); a number of stiffeners 7 are prefabricated on the brackets, which have completed prefabrication in the shipyard before offshore installation and welded with the brackets 6 as a whole; while welding, each bracket 6 has two welding seams, wherein the bottom of the brackets are welded with the top deck 5 of the column with small cross section, and connected with a bulkhead 15 of that as a whole by using full penetration weld; the side of brackets are welded with the inner shell 3 of the central pore canal of the column with large cross section, and connected with a bulkhead 16 of that as a whole by using full penetration weld.

The present disclosure is illustrated with the above-described embodiment. Structures of various parts, set positions and connections thereof can be varied. On the basis of the technical solutions according to the present disclosure, any improvement and equivalent transformation of individual parts made according to principles of the present disclosure should not be excluded from the protection scope of the present disclosure.

The invention claimed is:

1. A grouting and welding combined connection joint applied to a deepwater floating type platform, characterized in that the connection joint comprises:
a grouting system disposed inside an annular space formed by an inner shell of a central pore canal of a column with large cross section and an outer shell of a column with small cross section, as well as brackets welded on a top deck of the column with small cross section and the inner shell of the central pore canal of the column with large cross section; the grouting system including a number of shear keys, a diaphragm, upper and lower layer fixing devices, two sets of grouting systems and grouting material; and wherein said brackets are arranged uniformly along a circumferential direction of the top deck of the column with small cross section, with stiffeners prefabricated on the brackets, a bottom of the brackets being welded with the top deck of the column with small cross section, and connected with a bulkhead of the column with small cross section as a whole; a side of brackets being further welded with the inner shell of the central pore canal of the column with large cross section, and connected with a bulkhead of the column with large cross section as a whole.

2. The grouting and welding combined connection joint applied to a deepwater floating type platform as claimed by claim 1, characterized in that the welding structure further includes the brackets which connect the top of the column with small cross section and the inner shell of the central pore canal of the column with large cross section, as well as the stiffeners on the brackets; said brackets being arranged uniformly along the circumferential direction of the top deck of the column with small cross section, wherein the number of brackets included is determined by structural calculating results, the brackets comprising one or more of a sector plate, a curved plate, and a square plate; and wherein a number of stiffeners are prefabricated on the brackets, which have completed prefabrication in a shipyard before offshore installation and are welded with the brackets as a whole; wherein the welding includes, each bracket having two welding seams, wherein the bottom of a toggle plate is welded with the top deck of the column with small cross section, and connected with the bulkhead of the column with small cross section as a whole by using full penetration weld; and the side of the brackets are welded with the inner shell of the central pore canal of the column with large cross section, and connected with the bulkhead of the column with large cross section as a whole by using full penetration weld.

* * * * *